Patented Aug. 22, 1944

2,356,287

UNITED STATES PATENT OFFICE 2,356,287

OLIVE PROCESSING

Edward Van Dellen and Richard N. Ball,
Visalia, Calif.

No Drawing. Application May 8, 1942,
Serial No. 442,213

2 Claims. (Cl. 99—103)

This invention relates to olive processing, and particularly to the processing of ripe olives.

It is ordinary practice at the present time to process ripe olives by treating the olives after a preliminary fermentation period, in salt brine, with an alkaline solution of caustic soda. In order to darken the natural fruit pigments, several treatments are resorted to, with air exposure between treatments. This normally results in the well-known appearance of ripe olives as sold commercially, which is black or dark brown on the surface, with a nut-colored meat.

Sometimes olives are sold to the trade which are of mixed colors, having a mottled or pale surface. Olives of this character, as a rule, are not so readily salable.

The present invention has for an object the provision of a process wherein olives may be treated in such a manner as to produce olives which are uniformly black or of very dark brown color at the surface, with the edible or meat portion light in color. The resultant olive is commercially attractive.

Other objects include a process which may be readily utilized in any factory where olives are treated, at no greater cost than at present entailed, but with an assurance of uniform resulting product.

In the practice of our invention, we have found it advantageous to utilize salts of manganese, among which may be mentioned manganous sulfate, manganous chloride, manganous nitrate, manganous acetate, manganous lactate, manganous citrate, manganous phosphate, manganous tartrate, and manganous dioxide. The action of all of the above mentioned manganous salts appears to be partly catalytic, in that it serves as an aid in transmitting oxygen from the air to the olive tissue, although the improved color of the olives which results from the practice of our process may, in a measure, be due to the formation of insoluble black oxide in the olive tissue during the alkaline bath, as hereinafter set forth. In any event, the surface color of the olive becomes dark, while the meat remains light in color. Due to cheapness of cost, it has been found that manganous sulfate or manganous dioxide is commercially feasible and readily available. The sulfate is perhaps better for the reason that it is readily soluble.

In utilizing the manganese salts mentioned aforesaid, a selected manganous salt is placed in the brine during the preliminary fermentation period for the olives. By way of example, about 1 pound of manganous sulfate is used per 1000 gallons of olives, although a lesser amount of manganous sulfate may be used. The acid condition of the brine allows a portion of the manganous salt to penetrate into the olive tissue. The processing of the olives after treatment with a manganese salt is carried out in the regular manner, that is, by treating the olives in alkaline solutions, such as a lye treatment, with alternate air exposures. The manganese salt, through its penetraton of the olive tissue, catalyzes the oxidation of the natural pigments of the olive during the lye treatment and air exposure.

After the curing process is completed, the amount of manganese salt left in the olives is very small,—1 or 2 parts per million. It has been found that 10 to 20 parts per million of manganese salt in the finished product is ample to secure a very good color. No flavor is apparent in the olive, even though a residue of 100 parts per million is left in the olive. The residue is non-toxic even in this quantity.

It is quite unnecessary to use a manganese salt at any one stage of the process of treating the olives, as it may be at the beginning of the process, that is, the preliminary fermentation period, or at any stage of the treatment with the alkaline solution. However, as the manganese action is partly catalytic, it is well to remember that it aids in transferring oxygen from the air to the olive tissue and it, therefore, seems advisable although not necessary, to place a manganese salt into the brine solution during preliminary fermentation, in order to allow penetration of manganese salt evenly into the olive tissue before processing with lye and air exposure.

We claim:

1. In the processing of ripe olives, the steps of treating the olives to a preliminary fermentation period in salt brine, then subjecting the olives to successive treatments of alkaline solution alternated with air exposure, and adding manganese salts in a proportion of substantially a pound for a thousand gallons of olives to one of the steps of the treatment.

2. In the processing of ripe olives, the steps of treating the olives in a preliminary fermentation period of salt brine, then subjecting the olives to successive treatments of alkaline solution alternated with air exposure, and adding manganese salts in a proportion of substantially a pound for a thousand gallons of olives during the preliminary fermentation period.

EDWARD VAN DELLEN.
RICHARD N. BALL.